United States Patent
Tunzini et al.

(10) Patent No.: US 9,337,686 B2
(45) Date of Patent: May 10, 2016

(54) VEHICLE ALTERNATOR HAVING SYNCHRONOUS RECTIFICATION AND ELECTRONIC FAULT MANAGEMENT

(75) Inventors: Marc Tunzini, Versailles (FR); Olivier Grammont, Hardelot Plage (FR); Guillaume Duthilleul, Salles (FR); Victor Dos Santos, Le Creusot (FR)

(73) Assignee: Valeo Equipements Electriques Moteur (FR)

( * ) Notice: Subject to any disclaimer, the term of this patent is extended or adjusted under 35 U.S.C. 154(b) by 649 days.

(21) Appl. No.: 13/393,586

(22) PCT Filed: Jul. 22, 2010

(86) PCT No.: PCT/FR2010/051554
§ 371 (c)(1),
(2), (4) Date: Jul. 23, 2012

(87) PCT Pub. No.: WO2011/027056
PCT Pub. Date: Mar. 10, 2011

(65) Prior Publication Data
US 2012/0286744 A1    Nov. 15, 2012

(30) Foreign Application Priority Data

Sep. 7, 2009   (FR) .................................... 09 56067

(51) Int. Cl.
*H02P 9/30*      (2006.01)
*H02P 9/02*      (2006.01)
*H02J 7/14*      (2006.01)
(Continued)

(52) U.S. Cl.
CPC .............. *H02J 7/1461* (2013.01); *H02P 9/006* (2013.01); *H02P 29/022* (2013.01); *H02H 7/1252* (2013.01)

(58) Field of Classification Search
CPC ...... H02P 29/022; H02P 9/006; H02J 7/1461; H02H 7/1252; H02M 7/00
USPC .................................... 322/28, 24, 20, 44, 22
See application file for complete search history.

(56) References Cited

U.S. PATENT DOCUMENTS 5,376,876 A * 12/1994 Bauser et al. ................... 322/28
6,081,084 A *  6/2000 Crecelius ................. 318/400.35
(Continued)

FOREIGN PATENT DOCUMENTS

FR          2 909 492       6/2008
FR          2 917 253      12/2009

*Primary Examiner* — Tulsidas C Patel
*Assistant Examiner* — Viet Nguyen
(74) *Attorney, Agent, or Firm* — Berenato & White, LLC

(57) ABSTRACT

A synchronous rectification alternator for a motor vehicle is disclosed. The alternator includes a stator, a rotor, and a synchronous rectification system for rectifying into a DC voltage the alternating voltages supplied by the stator, and a voltage regulator for regulating the DC voltage. The alternator also includes fault detection for detecting faults in the synchronous rectification and supplying fault detection information to the voltage regulator. In one version, the fault information is supplied to the voltage regulator at fault inputs also receiving phase signals representing the alternating voltages supplied by the stator. At least one of the items of fault information is used to cause, in the voltage regulator, opening of an excitation circuit supplying current to an excitation coil of the rotor so as to produce, in the voltage regulator, a fault indication. The opening of the excitation circuit is preferably caused through a suitable command of a fast demagnetization transistor included in the excitation circuit.

16 Claims, 3 Drawing Sheets

(51) Int. Cl.
　　　*H02P 9/00*　　　(2006.01)
　　　*H02P 29/02*　　　(2016.01)
　　　*H02H 7/125*　　　(2006.01)

(56) References Cited

U.S. PATENT DOCUMENTS

| | | | |
|---|---|---|---|
| 6,346,797 B1 * | 2/2002 | Perreault et al. | 322/29 |
| 7,053,498 B1 * | 5/2006 | Boisvert et al. | 290/40 R |
| 7,224,144 B2 * | 5/2007 | Inokuchi et al. | 322/24 |
| 7,521,903 B2 * | 4/2009 | Renehan et al. | 322/24 |
| 2003/0006740 A1 * | 1/2003 | Henkel et al. | 322/59 |
| 2003/0201756 A1 * | 10/2003 | Hocken et al. | 322/24 |
| 2006/0238143 A1 * | 10/2006 | Uematsu et al. | 315/307 |
| 2009/0125176 A1 * | 5/2009 | Louise | 701/29 |
| 2009/0167257 A1 * | 7/2009 | Maddali et al. | 322/28 |
| 2010/0201304 A1 * | 8/2010 | Chemin | 318/806 |
| 2012/0098670 A1 * | 4/2012 | Rechdan et al. | 340/660 |

* cited by examiner

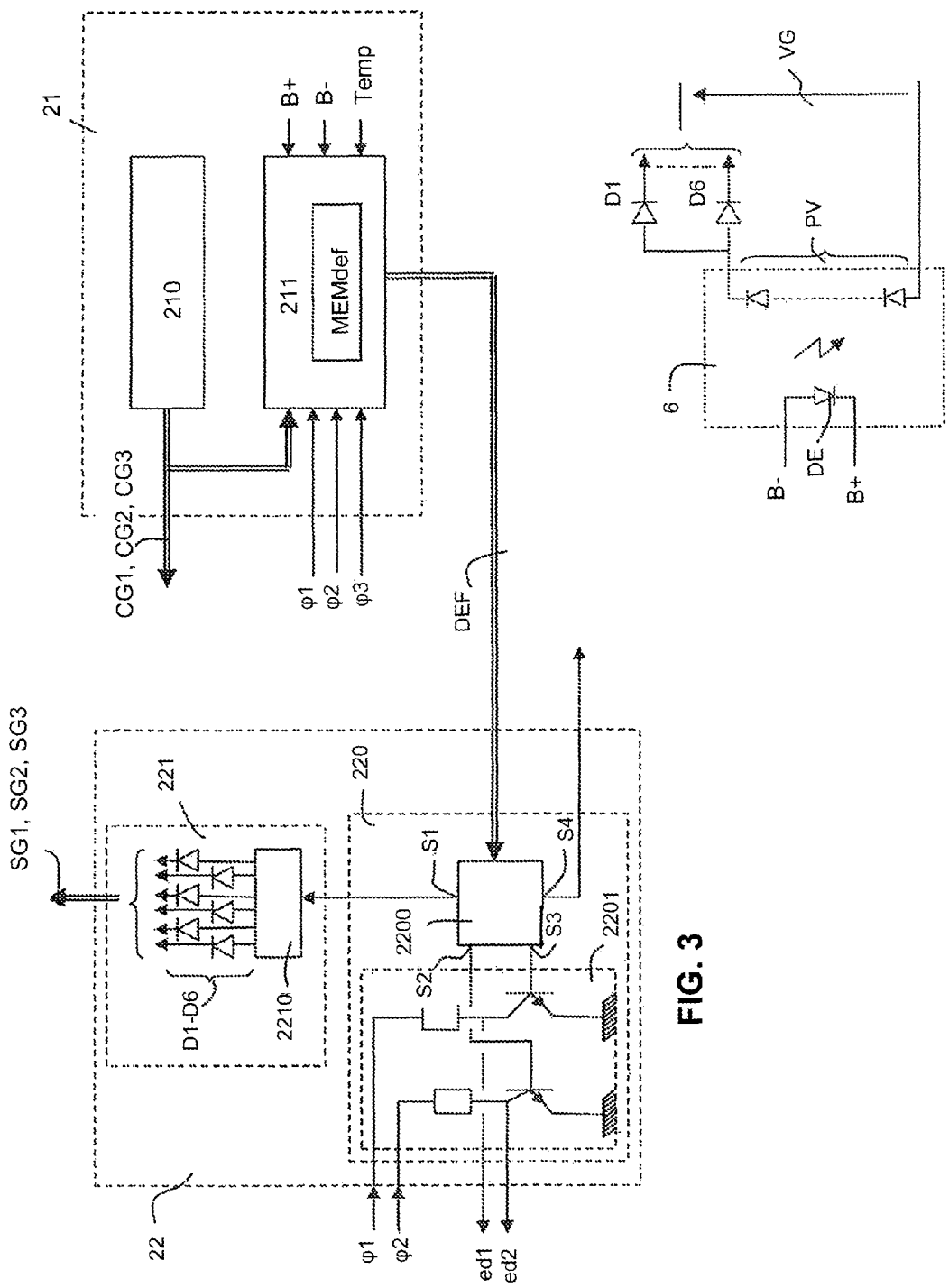

ly, the invention concerns an alternator with

VEHICLE ALTERNATOR HAVING SYNCHRONOUS RECTIFICATION AND ELECTRONIC FAULT MANAGEMENT

CROSS-REFERENCE TO RELATED APPLICATIONS AND CLAIM TO PRIORITY

This application relates to International Application No. PCT/FR2010/051554 filed Jul. 22, 2010 and French Patent Application No. 09/56067 filed Sep. 7, 2009, of which the disclosures are incorporated herein by reference and to which priority is claimed.

FIELD OF THE INVENTION

The present invention concerns in general terms the field of rotary electrical machines, in particular for motor vehicles. More particularly, the invention concerns an alternator with synchronous rectification equipped with electronic fault management means.

BACKGROUND OF THE INVENTION

In the context of reducing $CO_2$ emissions and developing high-efficiency alternators, the synchronous rectification technology applied to alternators for motor vehicles has a certain interest.

Synchronous rectification uses a bridge rectifier with power transistors, generally of the MOSFET type. Control electronics are also provided for shaping suitable control signals for the power transistors.

Compared with conventional alternator technology with a diode bridge rectifier, the proportion of electronics in synchronous rectification machines is increasing significantly.

In terms of cost, the proportion of electronics in a synchronous rectification machine may be between 30% and 50% of the total cost of the machine. By way of comparison, the proportion of the cost of the electronics in diode bridge rectification machines is around 25%. A breakdown in the electronics requiring a replacement of the faulty part may therefore give rise to appreciable cost repercussions in after-sales service operations.

Reliability of the electronics is essential for the overall reliability of the machine and gives rise to novel constraints for the designers. These constraints are all the more severe since the current trend in motor manufacturers is to extend the guarantee period for the vehicles.

It is therefore desirable to propose solutions affording an improvement in the overall reliability of a synchronous rectification alternator and, more particularly, the reliability of the electronics in such a alternator.

SUMMARY OF THE INVENTION

According to a first aspect, the invention concerns a synchronous rectification alternator for a motor vehicle, comprising a stator, a rotor, synchronous rectification means for rectifying into a DC voltage the alternating voltages supplied by the stator, and voltage regulation means for regulating the DC voltage.

In accordance with the invention, the alternator also comprises fault detection means for detecting faults in the synchronous rectification means and supplying fault detection information to the voltage regulation means.

According to a particular feature, the fault information is supplied to the voltage regulation means at fault inputs also receiving phase signals representing the alternating voltages supplied by the stator.

According to another particular feature, at least one of the items of fault information is used to cause, in the voltage regulation means, opening of an excitation circuit supplying current to an excitation coil of the rotor so as to produce, in the voltage regulation means, a fault indication corresponding to the said at least one of the fault information items. Preferably, the opening of the excitation circuit is caused through a suitable command of a fast demagnetisation transistor included in the excitation circuit.

According to yet another particular feature, the fault detection means comprise means for detecting faults occurring in arms of a transistor bridge rectifier of the synchronous rectification means, the detection being performed using phase signals taken at mid-points of the arms, control signals applied to control electrodes of the transistors and voltages present on the positive and negative voltage terminals of the alternator.

According to yet another particular feature, the fault detection means comprise means for detecting overheating faults occurring in arms of the transistor bridge rectifier of the synchronous rectification means.

According to a particular embodiment, the fault detection means comprise means for detecting a faulty connection of a battery of the motor vehicle to an electrical supply network to which the alternator is also connected when the latter is installed in the vehicle, the detection being performed using a measurement of voltage appearing between the positive and negative voltage terminals of the alternator. In addition, in this embodiment, a detection of a faulty connection of the battery is effective when a negative voltage of between −1 volt and −2 volts is measured between the positive and negative voltage terminals of the alternator.

According to another particular feature, the alternator comprises means for protecting the alternator when a faulty connection of the battery is detected by the fault detection means. The protection means may for example comprise a charge pump circuit and/or a photovoltaic isolator.

According to yet another particular feature, the fault detection means also comprise means for storing information on faults detected and/or transmitting these to an electronic control unit of the vehicle.

BRIEF DESCRIPTION OF THE DRAWINGS

Other aspects, aims and advantages of the present invention will emerge more clearly from a reading of the following detailed description of a particular embodiment thereof, given by way of non-limitative example and made with reference to the accompanying drawings, in which:

FIG. 3 shows block diagrams of a bridge rectifier control circuit and a fault protection and transmission circuit included in the alternator in FIG. 1; and FIG. 4 shows a particular embodiment of a protection circuit included in the alternator in FIG. 1, provided for protecting the alternator against a vehicle battery connection reversal.

DETAILED DESCRIPTION

Figure 1:
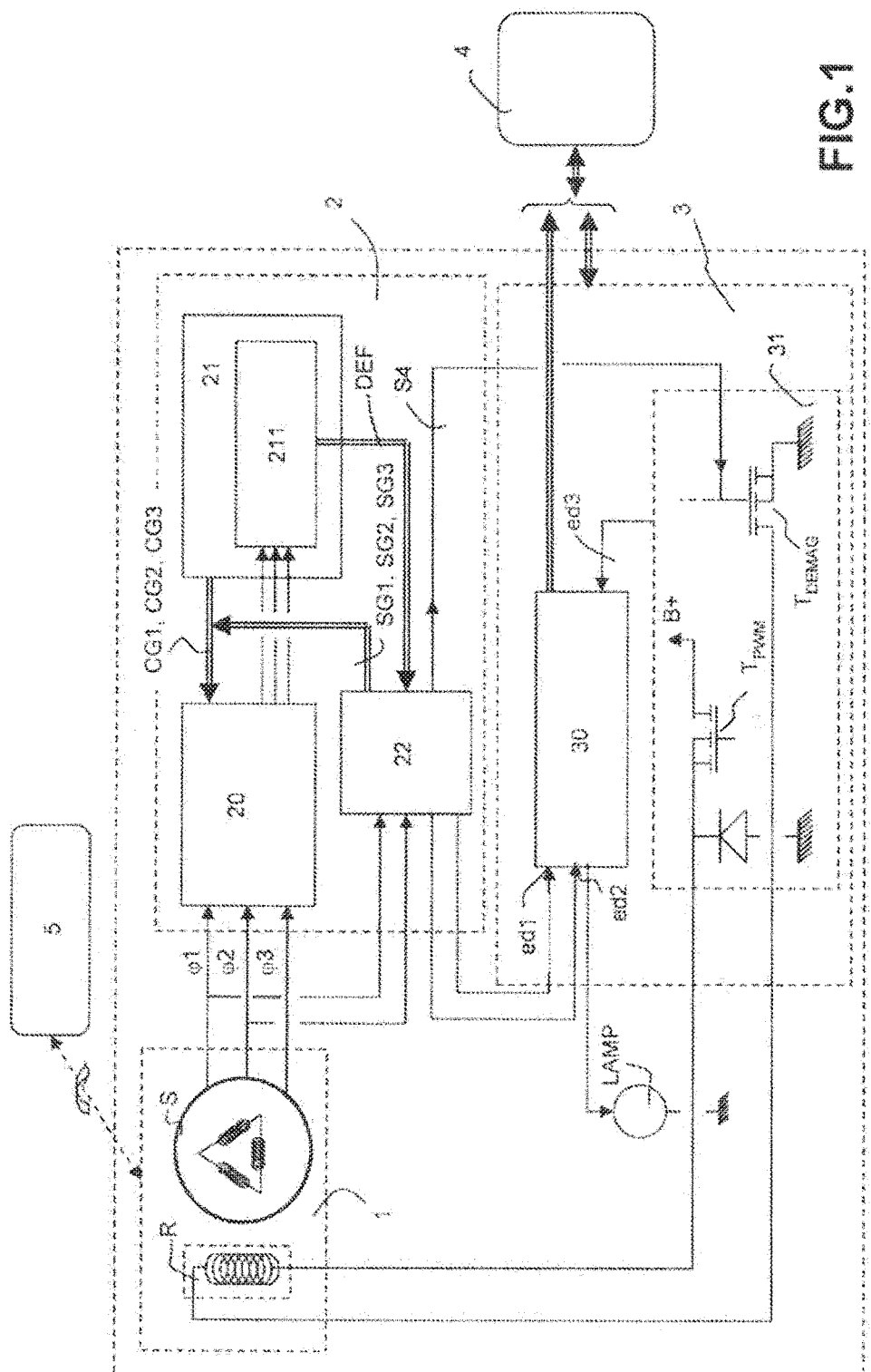
FIG. 1 is a general block diagram of an embodiment of the alternator according to the invention.

As shown in FIG. 1, the alternator according to the invention comprises a rotary electrical machine 1, a voltage rectification circuit 2 and a voltage regulator 3.

In this embodiment, the machine 1 is a three-phase machine of the Lundell type and comprises, in a conventional manner, a stator S and a claw rotor R comprising an excitation coil. The rotor R is rotated by means of a transmission belt connecting it to the crankshaft of the thermal engine 5 of the vehicle.

The voltage rectification circuit 2 is of the synchronous rectification type and comprises a voltage rectification bridge 20, a bridge control circuit 21 and a fault protection and transmission circuit 22.

Figure 2:
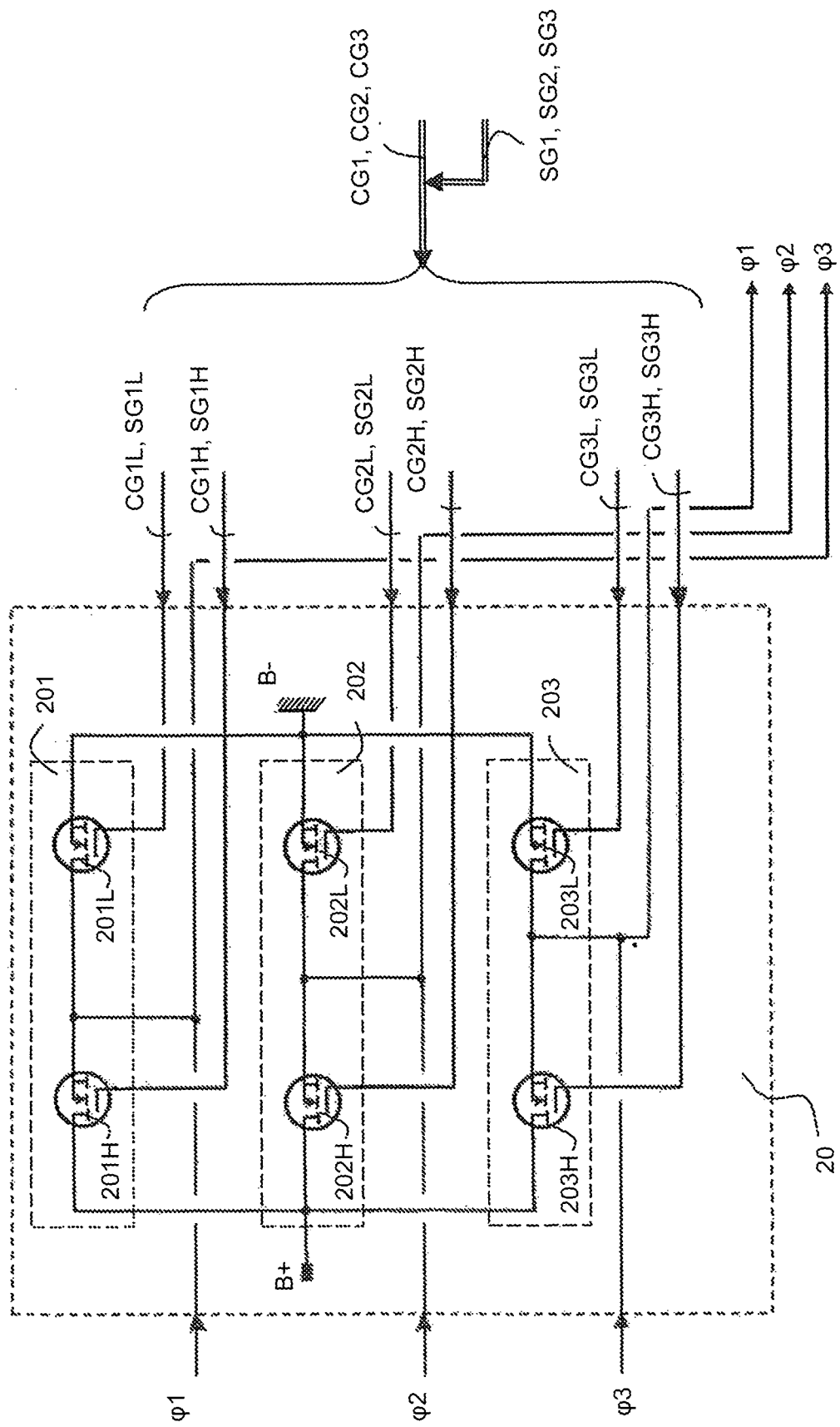
FIG. 2 is a simplified diagram of a transistor bridge rectifier included in the alternator in FIG. 1.

As shown in FIG. 2, the voltage rectification bridge 20 is a MOSFET transistor bridge. First, second and third bridge arms 201, 202 and 203 are each formed from two MOSFET transistors 201H and 201L, 202H and 202L, and 203H and 203L, respectively. The transistors in the same arm have first power electrodes (drain, source) connected together at an arm mid-point and second power electrodes (drain, source) connected respectively to voltage terminals B+ and B− of the alternator. The B+ terminal conventionally delivers the +12 V voltage of the vehicle supply network. The B− terminal is connected to the earth of this same voltage supply network.

Three phase voltages φ1, φ2 and φ3 supplied by the machine 1 are applied respectively to the three mid-points of the bridge arms 201, 202 and 203 of the rectification bridge 20 between the two MOSFET transistors 201H and 201L, 202H and 202L, and 203H and 203L, respectively, and supply these bridge arms 201, 202 and 203.

Control electrodes (gates) of the transistors 201H and 201L, 202H and 202L, and 203H and 203L, receive respectively gate control signals CG1H and CG1L, CG2H and CG2L, and CG3H and CG3L. These signals CG1, CG2 and CG3 control the transistors so as to make them function as synchronous rectifiers.

The bridge control circuit 21 is shown in detail in FIG. 3. This circuit 21 comprises a circuit 210 for shaping gate control signals and a fault detection circuit 211.

The circuit 210 for shaping gate control signals performs a suitable shaping of the signals CG1, CG2 and CG3 so as to obtain a synchronous-rectification functioning of the MOSFET transistors of the bridge 20. This type of synchronous-rectification functioning of MOSFET transistors is known to persons skilled in the art and will not be described here.

The function of the fault detection circuit 211 is essentially to detect faults in the voltage rectification bridge 20. However, certain faults in the stator windings of the stator S could, in certain embodiments of the invention, also be detected by this circuit 211 because of the information contained in the signals supplied to the circuit 211.

In this embodiment, the fault detection circuit 211 receives as an input the gate control signals CG1, CG2 and CG3, the phase voltages φ1, φ2 and φ3, the voltages of the terminals B+ and B− and temperature information Temp supplied for example by a temperature sensor (not shown). From the values of these various signals that are compared with thresholds and an associated logic processing, the fault detection circuit 211 is capable of detecting a reversal of the connection of the vehicle battery terminals (referred to as "reverse battery" in English terminology), overheating of the bridge 20 and any failures of the MOSFET transistors.

The fault or faults detected are here coded in the fault detection circuit 211 before being transmitted to the fault protection and transmission circuit 22 by the circuit 211. For example, a two-bit binary fault word DEF is provided for indicating various types of fault. Four different faults DEF1, DEF2, DEF3 and DEF4 can thus be coded in two bits in the fault word DEF.

In this embodiment, the fault DEF1 is the battery connection reversal fault and the faults DEF2, DEF3 and DEF4 are respectively the fault of overheating of the voltage rectification bridge 20, a short-circuit fault in an arm of the bridge 20 (transistor short-circuited) and an open-circuit fault in the bridge 20.

The battery connection reversal fault occurs in the case where, for one reason or another, the B+ and B− terminals of the alternator are connected not to the +12 V and 0 V terminals of the battery, but to the 0 V and +12 V terminals respectively. This normally occurs when an operator reverses the two cables of the vehicle that must be connected to the battery.

The inventive entity found that, in the case of a battery connection reversal fault DEF1, a negative voltage TIB of between −1 V and −2 V appeared between the terminals B+ and B−. The presence of this voltage TIB is detected by the fault detection circuit 211, which consecutively deduces therefrom a battery connection reversal fault DEF1.

In accordance with this embodiment, when the battery connection reversal fault DEF1 is detected, the occurrence of this fault is stored in an internal memory MEMdef of the fault detection circuit 211. Such a storage of the occurrence of a battery connection reversal fault enables the manufacturer of the alternator, in certain after-sales service situations, to deny responsibility in the event of damage caused to the alternator or to the vehicle by a battery connection reversal operation. In other embodiments, all the faults appearing are stored in the internal memory MEMdef in the form for example of a fault history.

The fault word DEF (DEF1, DEF2, DEF3 and DEF4) is transmitted by the circuit 211 to the fault protection and transmission circuit 22.

As shown in FIG. 3, the fault protection and transmission circuit 22 comprises a fault transmission circuit 220 and a circuit 221 for protection in the event of battery connection reversal.

The fault transmission circuit 220 comprises in particular a decoding circuit 2200 and a switching circuit 2201 with two transistors. The decoding circuit 2200 receives the word DEF transmitted by the fault detection circuit 211 and activates outputs S1, S2, S3 and/or S4 according to the decoding made of the word DEF received.

The output S1 is activated when a battery connection reversal fault DEF1 occurs. The output S1, when it is active, demands the activation of the protection circuit 221.

The protection circuit 221 comprises a voltage source 2210 and six outputs SG1H, SG1L, SG2H, SG2L, and SG3H, SG3L that each deliver a voltage VG supplied by the voltage source when the circuit is activated by the output S1.

The six outputs SG1H, SG1L, SG2H, SG2L and SG3H, SG3L are connected respectively to the gates of the transistors 201H, 201L, 202H, 202L and 203H, 203L through diodes D1 to D6. When the circuit 221 is activated, the voltage VG, around 6 volts in this embodiment, is applied to the gates of the transistors 201H, 201L, 202H, 202L and 203H, 203L so as to force these into a conduction state.

This arrangement affords a reduction in the power dissipated by the MOSFET transistors, so that the user has more time before the voltage rectification bridge 20 is damaged in order to become aware of his error in reversing the battery cables and eliminate the fault.

This is because, in the case of this battery connection reversal fault DEF1, the bridge 20 is subjected to a negative voltage and the antiparallel diodes of the MOSFET transistors are then conductive. The current passing through the transistors is then extremely high, around 300 A and, if no step is taken, the power to be dissipated by each transistor is approximately 300 A×0.8 V-2400 W, the voltage of 0.8 V being the direct voltage appearing at the terminals of the antiparallel diode for a current of 300 A. The silicon chip of the transistor can withstand these conditions only for a few fractions of a second.

In accordance with the invention, because of the application of the voltage VG on the gates of the transistors, the latter go into a conduction state, so that the power dissipated by each transistor is around $(300 A)^2 \times 0.002\Omega = 180$ W, the ohmic value of 0.002 Ω corresponding to the equivalent resistance of the transistor in the conduction state thereof. A MOSFET power transistor can withstand these conditions for several seconds, which leaves time for the user to realise his error in reversing the battery cables and eliminate this fault.

A supply source of the protection circuit 221 making it possible to obtain the voltage VG can be implemented by means of a charge pump circuit such as the MAX 865 circuit sold under the registered trademark MAXIM.

In a different embodiment, it is also possible to use a photovoltaic isolator of the PVI5050N or PVI5080N type (registered trademarks), as shown by the reference 6 in FIG. 4. Such an isolator 6 makes it possible to detect a battery connection reversal and to apply a voltage VG to the gates of the MOSFET transistors. An emitting diode DE of the isolator 6 is connected between the terminals B+ and B− so that it becomes conductive when the negative voltage TIB (between +1 V and −2 V as indicated previously), due to the battery connection reversal, appears between these electrodes.

The passage of a direct current in the emitting diode DE causes the appearance of a voltage at the terminals of photovoltaic elements PV of the isolator 6. The voltage VG is obtained from the voltage supplied by the photovoltaic elements PV.

The fault information DEF1, DEF2, DEF3 and DEF4 is transmitted to the voltage regulator 3 by the fault transmission circuit 220. The voltage regulator 3 can thus trigger fault operating modes, activate a fault signal (indicator light) for the user of the vehicle and/or indicate the occurrence of a fault to an electronic control unit of the vehicle, such as an engine control unit 4 (shown in FIG. 1), with which the regulator 3 is in communication. The outputs S2, S3 and S4 of the circuit 2200 are used for transmitting fault information DEF1, DEF2, DEF3 and DEF4 to the voltage regulator 3.

In this embodiment, a regulator 3 is used that comprises phase fault detection inputs ed1 and ed2, to which the phase signals φ1 and φ2 are applied. In this type of regulator, these fault inputs ed1, ed2 are normally provided for detecting phase faults in the alternator 1. It is thus possible to detect short-circuit and open-circuit phases by these means. The availability of these inputs ed1 and ed2 is taken advantage of in this embodiment of the invention in order to indicate to the regulator 3 faults DEF detected by the fault detection circuit 211.

According to the faults to be indicated to the regulator 3, the inputs ed1 and ed2 are placed at appropriate voltage levels, recognisable by the regulator 3 in order to indicate faults. The signals S2 and S3 force the states of the inputs ed1 and ed2 by means of the transistors of the switching circuit 2201 (cf. FIG. 3), according to the faults to be indicated.

A fault management circuit 30 and rotor excitation circuit 31 included in the regulator 3 are shown in FIG. 1. The fault management circuit 30 is the circuit incorporating the fault inputs ed1 and ed2 indicated above as well as another fault input ed3.

The fault input ed3 indicates an open-circuit fault in the excitation circuit 31 of the alternator rotor R. The rotor excitation circuit 31 comprises known means for detecting and indicating an open-circuit state. Such means detect an open circuit for example because of the presence of a zero excitation current during at least one period greater than a certain predetermined threshold period.

As is clear in FIG. 1, the rotor excitation circuit 31 comprises two transistors $T_{PWM}$ and $T_{DEMAG}$. The transistor $T_{PWM}$ is a power transistor that controls a pulse width modulation of the excitation current supplying the excitation coil of the rotor R. The transistor $T_{DEMAG}$ is a power transistor that opens the excitation circuit when it is necessary to demagnetise the alternator quickly. The two transistors $T_{PWM}$ and $T_{DEMAG}$ are here both transistors of the MOSFET type.

In accordance with the invention, the presence of the transistor $T_{DEMAG}$ is here used as a means for forcing an opening of the rotor excitation circuit 31 so as to cause a fault to be fed back to the fault management circuit 30, through the activation of the fault input ed1. When a fault DEF corresponding to an activation of the output S4 of the circuit 2200 must be indicated to the regulator 3, the gate of the transistor $T_{DEMAG}$ is controlled by the output S4 so as to cause this transistor to be switched off, thus forcing an opening of the current circuit.

The fault management circuit 30 processes the various items of fault information that arrive at it through the inputs ed1, ed2 and ed3 so as, depending on the application, to indicate these faults to the engine control unit 4 and/or to optionally establish suitable fault operating modes. In addition, the fault management circuit 30 can also control the activation of an indicator LAMP to indicate certain faults to the user of the vehicle.

In accordance with the invention, it will be arranged for the transmission of the fault information of the fault detection circuit 22 to the fault management circuit 30 of the voltage regulation circuit 3 to be able to take place by various means, as is clear from the above description, and for various types of coding to be able to be used to transmit this information. Apart from the choice of the activation of the inputs ed1, ed2 and ed3 that are activated to transmit the information, other coding parameters can also be used, such as for example distinct predetermined periods for activation of the fault inputs ed1, ed2 and ed3 in order to transmit different items of fault information.

Moreover, it should be noted that the various electronic control circuits that have been described here, namely the circuits 21, 22 and 3, according to the various embodiments of the invention, can be implemented in the form of one or more ASICs.

Naturally, the invention is not limited to the particular embodiments that have just been described. Other embodiments are possible according to the applications envisaged by a person skilled in the art and remain within the scope of the accompanying claims.

The invention claimed is:

1. A synchronous rectification alternator for a motor vehicle, comprising:
   a stator (S);
   a rotor (R);
   a synchronous rectification circuit (2) for rectifying alternating phase voltages (φ1, φ2, φ3) supplied by said stator (S) into a DC voltage (B+);
   a voltage regulator (3) for regulating said DC voltage; and
   a fault detection means (211, 22) for detecting faults (DEF) in said synchronous rectification circuit (2) and supplying fault detection information (DEF, S2, S3, S4) to said voltage regulator (3);
   said fault detection means including a fault detection circuit (211) receiving said alternating phase voltages (φ1, φ2, φ3).

2. The alternator according to claim 1, wherein said voltage regulator (3) comprises phase fault detection inputs (ed1, ed2) receiving said alternating phase voltages (φ1, φ2) supplied by said stator (S); and wherein at least one of items of said fault detection information is supplied to said voltage regulator (3) at said fault inputs (ed1, ed2).

3. The alternator according to claim 1, wherein said voltage regulator (3) includes a rotor excitation circuit (31) supplying current to an excitation coil of said rotor (R); and wherein at least one of items of said fault detection information causes an opening of said rotor excitation circuit (31) so as to produce in said voltage regulator (3) a fault detection indication (ed3) corresponding to said at least one of said items of said fault detection information.

4. The alternator according to claim 3, wherein said opening of said rotor excitation circuit is caused by means of a suitable command to a fast demagnetisation transistor ($T_{DEMAG}$) included in said rotor excitation circuit (31).

5. The alternator according to claim 1, wherein said synchronous rectification circuit (2) comprises a transistor rectification bridge (20) including a plurality of bridge arms (201, 202, 203); wherein each of said bridge arms includes two transistors; wherein said fault detection circuit (211) detects faults occurring in said bridge arms (201, 202, 203) of said transistor rectification bridge (20) of said synchronous rectification circuit (2); and wherein said fault detection circuit (211) receives as an input said phase voltages (φ1, φ2, φ3) taken at mid-points of said bridge arms (201, 202, 203) between said two transistors, control signals (CG1L, CG1H, CG2L, CG2H, CG3L, CG3H) applied to control electrodes of said transistors (201L, 201H, 202L, 202H, 203L, 203H), and voltages of positive and negative voltage terminals (B+, B−) of said alternator.

6. The alternator according to claim 5, wherein said fault detection means comprise means (211, Temp) for detecting overheating faults occurring in said bridge arms of said transistor rectification bridge of said synchronous rectification means.

7. The alternator according to claim 5, wherein said vehicle comprises a battery and an electrical supply network electrically connected to both said battery and said alternator; and wherein said fault detection circuit (211) comprises means (211, 6) for detecting any faulty connection of said battery to said electrical supply network, said fault detection being performed using a measurement of voltage (TIB) between said positive and negative voltage terminals (B+, B−) of said alternator.

8. The alternator according to claim 7, further comprising protection means (S1, 221, SG1H, SG1L, SG2H, SG2L, SG3H, SG3L) for protecting said alternator when a faulty connection of said battery is detected by said fault detection circuit (211).

9. The alternator according to claim 8, wherein said protection means further comprise a charge pump circuit and/or a photovoltaic isolator (6).

10. The alternator according to claim 5, wherein said fault detection circuit (211) further receives said gate control signals (CG1L, CG1H, CG2L, CG2H, CG3L, CG3H).

11. The alternator according to claim 1, wherein said fault detection circuit (211) further comprise means (MEMdef) for storing information on said detected faults and/or transmitting said detected faults to an electronic control unit (4) of said vehicle.

12. The alternator according to claim 1, wherein said fault detection circuit (211) includes an internal memory (MEMdef).

13. The alternator according to claim 12, wherein at least one of items of said fault detection information is stored in said internal memory (MEMdef) of said fault detection circuit (211).

14. The alternator according to claim 12, wherein all of said fault detection information is stored in said internal memory (MEMdef) of said fault detection circuit (211).

15. The alternator according to claim 1, wherein said voltage regulator (3) is electrically connected to an engine control unit (4).

16. The alternator according to claim 1, wherein said synchronous rectification circuit (2) comprises a transistor rectification bridge (20) including a plurality of bridge arms (201, 202, 203); wherein each of said bridge arms includes two transistors (201L, 201H, 202L, 202H, 203L, 203H) controlled by gate control signals (CG1L, CG1H, CG2L, CG2H, CG3L, CG3H) applied to control electrodes of said transistors (201L, 201H, 202L, 202H, 203L, 203H); and wherein said fault detection circuit (211) detects faults occurring in said bridge arms (201, 202, 203) of said transistor rectification bridge (20) of said synchronous rectification circuit (2).

* * * * *